Oct. 12, 1965  C. E. BAXLEY ETAL  3,211,213
SEALING OF REGENERATIVE AIR HEATER BY INCOMING AIR
Filed July 23, 1962  2 Sheets-Sheet 1
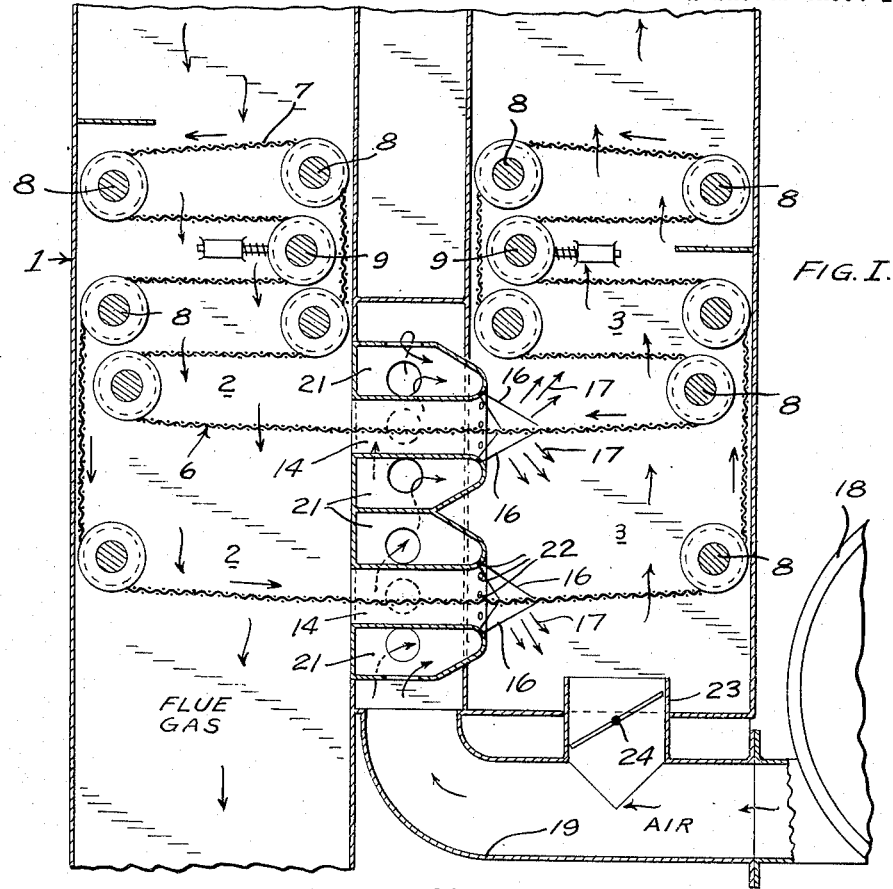
FIG. I.
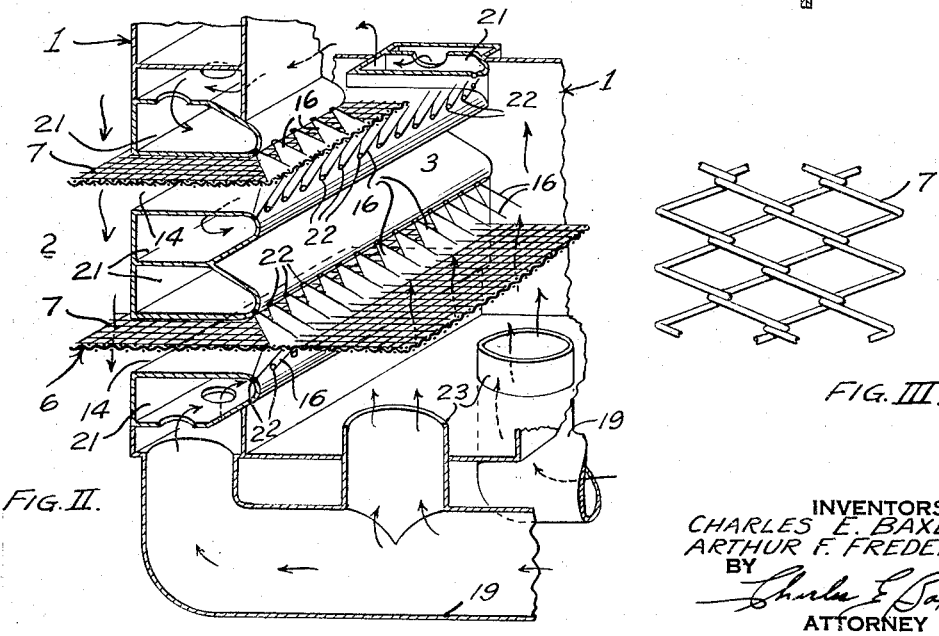
FIG. II.
FIG. III.
INVENTORS
CHARLES E. BAXLEY
ARTHUR F. FREDERICK
BY
ATTORNEY Oct. 12, 1965  C. E. BAXLEY ETAL  3,211,213
SEALING OF REGENERATIVE AIR HEATER BY INCOMING AIR
Filed July 23, 1962  2 Sheets-Sheet 2
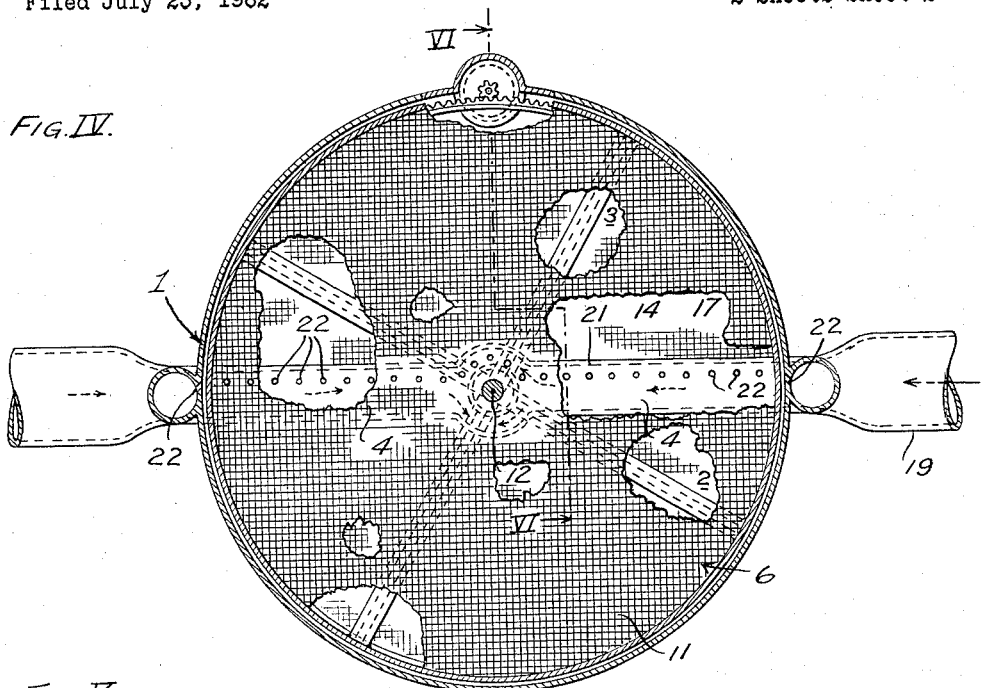
FIG. IV.
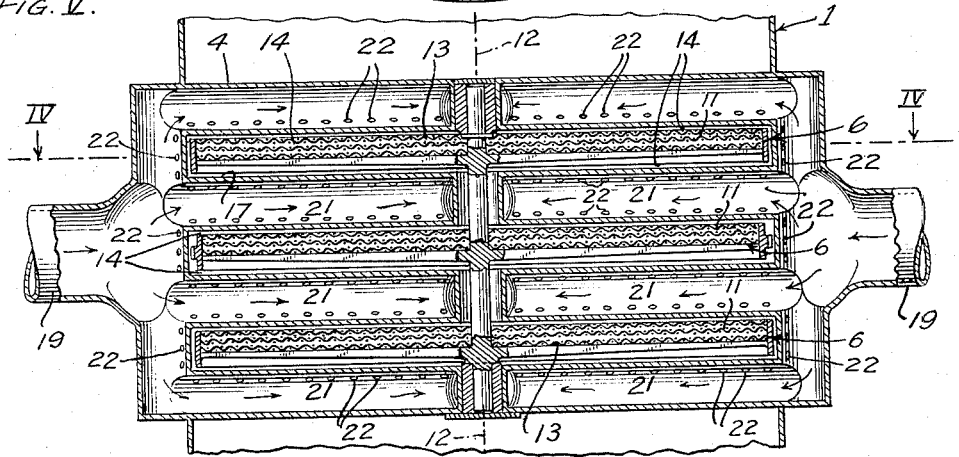
FIG. V.
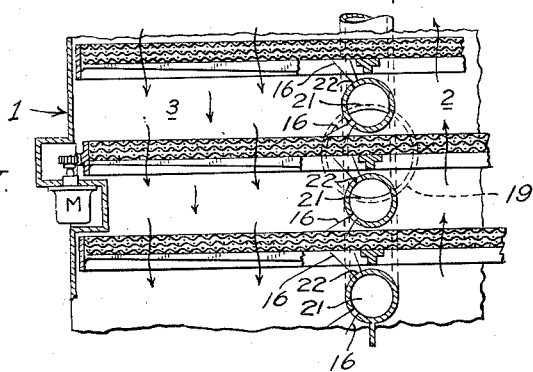
FIG. VI.
INVENTORS
CHARLES E. BAXLEY
ARTHUR F. FREDERICK
BY
ATTORNEY 3,211,213
SEALING OF REGENERATIVE AIR HEATER
BY INCOMING AIR
Charles E. Baxley, Summit, N.J., and Arthur F. Frederick, Queens, N.Y., assignors to Foster Wheeler Corporation, New York, N.Y., a corporation of New York
Filed July 23, 1962, Ser. No. 211,722
7 Claims. (Cl. 165—9)

This invention relates to regenerative air preheaters. It is a seal to minimize escape of air from pressurized air conduits out of the flue.

Air preheaters of this type alternate a regenerative mass between contact with flue gas and incoming air to effect heat exchange therebetween. Various types of contact seals are currently employed to minimize air loss. But contact sealing imposes stringent manufacturing tolerances, construction limitations and expensive maintenance.

The present invention contemplates the use of incoming air for jet sealing. A stream of air is injected into the air compartment to present a fluid barrier to leakage of air.

Basically this teaching makes air preheaters more compatible with conditions which prevail in the boiler industry.

Pressurized air is needed anyway. So the head loss incident to jet sealing becomes an incremental air pressurizing cost with consequent economy.

Jets improve heat extraction from the regenerative mass and also serve to clean the mass.

These and other advantages will appear more fully from the accompanying drawings wherein:

FIGURE I is an idealized sectional elevation view illustrating an endless belt species of regenerative air preheater embodying the present invention.

FIGURE II is a sectional projection view of the jet seals of FIGURE I.

FIGURE III depicts an open wire mesh suitable for the endless belt in the preheater of FIGURE I.

FIGURE IV is a top sectional view taken along line IV—IV showing the rotary species of a regenerative air preheater including the teaching of this invention.

FIGURE V is a fragmentary side view depicting the rotary air preheater of FIGURE IV.

FIGURE VI is an enlarged sectional view taken along line VI—VI of FIGURE V and depicting jet seals acting on permeable mats of the rotary species of this invention.

Comparable elements will be assigned the same numeral in both species.

The shown devices preheat combustion air using heat extracted from waste flue gas. Essential features of endless belt type and rotary type air preheaters are well known to the boiler industry, so only the environmental features pertinent to this disclosure will here be mentioned.

In FIGURE I, stationary housing 1 defines first compartment 2 and second compartment 3. Flue gas passes through first compartment 2. Air is passed through second compartment 3 on its way to a furnace or other suitable combustion apparatus. In similar fashion in the rotary species of FIGURES IV through VI, stationary housing 1 defines border 4 which describes first sectoral compartment 2 and second sectoral compartment 3. For simplicity each of the sectoral compartments are shown semicircular in section, although other sectoral arrangements are also contemplated.

A regenerative mass generally designated 6 serves to transfer heat from the flue gas to the combustion air. Toward this objective the regenerative mass is alternated between first compartment 2 and second compartment 3.

In FIGURE I the regenerative mass is endless belt 7 which is mounted on rollers 8 and has a drive motor (not shown). Rollers 9 can be movably supported to accommodate tightening of the belt. One suitable endless belt fabric is also shown in detail in FIGURE III. In FIGURES IV through VI cylindrical matrixes 11 are employed in the rotary species of the invention. Matrices 11 have a suitable turning means and are mounted for rotation about axis 12. Regenerative matrices 11 include permeable mats 13 disposed normal to axis 12.

Passages 14 communicate first compartment 2 and second compartment 3 for movement of endless belt 7 therebetween in FIGURE I. In FIGURES IV through VI border 4 described passages 14 which communicate first sectoral compartment 2 and second sectoral compartment 3.

Incoming air is employed to seal passages 14. Injecting means are operatively associated with the passages for introducing streams 16 of air into second compartment 3 so that streams 16 present a fluid barrier 17 to leakage of fluid through passages 14. Air is pressurized by blower 18 and is transmitted via conduit 19 to injection chambers 21 in the vicinity of passages 14. Orifices 22 communicate injection chambers 21 with second compartment 3 to introduce streams 16 of air thereto.

Not all of the incoming air need be transmitted to second compartment 3 by way of injection chambers 21. In most instances only a minor portion of the incoming air would be required for sealing passages 14. Shunt conduit 23 also communicates blower 18 with second compartment 3 to bypass injection chambers 21. Damper means 24 would be available to control pressure differential across orifices 22.

It will be obvious that wide changes may be made in the details of the shown embodiment without departing from the spirit of invention defined by the claims.

What is claimed is:
1. An endless belt regenerative heater
   comprising a housing which defines a first compartment and a second compartment, each compartment having a longitudinal axis, the longitudinal axes being parallel,
   means for circulating a first high temperature fluid through the first compartment,
   the housing defining at least one passage communicating the first compartment and the second compartment,
   a permeable endless belt comprising an open mesh woven wire,
   the endless belt mounted for continuous circulation between the first compartment and the second compartment via the passage to transfer heat between said fluids,
   the housing defining an injection chamber bordering the passage,
   a source of second fluid at a low temperature relative said first fluid,
   means operatively associated with the sources of said fluids to pressurize the second fluid to a pressure higher than that of the first fluid,
   a delivery conduit communicating the source of second fluid with the injection chamber,
   the delivery conduit reducing in section area toward the injection chamber to increase the velocity of the second fluid flowing therethrough,
   the housing defining at least one orifice communicating the injection chamber with the second compartment to introduce a stream of second fluid into the second compartment, means causing the pressure in the injection chamber to be higher than that in the second compartment so that the stream presents a fluid barrier to leakage of the second fluid through the passage, means for exhausting the second fluid from the second compartment.

2. A heater comprising;

a housing which defines a first compartment and a second compartment;

first fluid circulating means for circulating a first fluid through the first compartment;

second fluid circulating means for circulating a second fluid through the second compartment;

the housing defining a passage communicating the first compartment and the second compartment, the passage having a width and height;

a regenerative mass;

means for alternating the regenerative mass between the first compartment and the second compartment via the passage to transfer heat between said fluids;

injecting means comprising nozzle means approximately coextensive with the passage width on opposite sides of said regenerative mass to inject inclined streams of fluid towards said regenerative mass and second compartment and into the second compartment;

means to transmit a portion of the second fluid directly from said second fluid circulating means to said injecting means;

means in said second fluid circulating means adapted to create a pressure in the injecting means sufficiently in excess of the pressure in the second compartment so that said inclined streams of fluid present a fluid barrier to leakage of the second fluid through the passage.

3. An endless belt regenerative heater comprising;

a housing which defines a first compartment and a second compartment therein;

first fluid circulating means for circulating a first fluid through the first compartment;

second fluid circulating means for circulating a second fluid through the second compartment;

the housing defining at least one passage communicating the first compartment and the second compartment, the passage having a width and height;

an endless belt regenerative mass mounted for continuous circulation between the first compartment and the second compartment via the passage to transfer heat between said fluids;

injecting means comprising nozzle means approximately coextensive with the passage width on opposite sides of said belt to inject inclined streams of fluid towards said belt and second compartment and into the second compartment;

means to transmit a portion of said fluid directly from said second fluid circulating means to said injecting means;

means in said second fluid circulating means adapted to create a pressure in the injecting means sufficiently in excess of the pressure in the second compartment so that said inclined streams of fluid present a fluid barrier to leakage of the second fluid through the passage.

4. The heater of claim 3 wherein said last mentioned means comprises an orifice means between said second fluid circulating means and the second compartment, and means to restrict the size opening of said orifice means.

5. The heater of claim 3 wherein the second fluid circulating means comprises a conduit having a bifurcated first end portion and a second end portion, a fan connected to the second end portion, said first end portion comprising respectively a passageway communicating with the injecting means, an orifice means communicating with the second compartment, and an adjustable butterfly valve disposed in the orifice means for varying the pressure differential between the injecting means and the second compartment.

6. A rotary regenerative heater comprising;

a permeable cylindrical regenerative matrix having an axis and mounted for rotation about its axis;

a stationary housing embracing the matrix;

the housing defining a border which divides the housing into a first sectoral compartment and a second sectoral compartment;

first fluid circulating means for circulating a first fluid through the first compartment;

second fluid circulating means for circulating a second fluid through the second compartment;

means limiting fluid flow through the matrix to paths substantially parallel to the axis thereof;

the border describing a passage which communicates the first compartment and the second compartment, the passage having a width and height;

turning means for rotating the matrix about the axis to alternate the matrix through said passage between the first compartment and the second compartment to transfer heat between the first fluid and the second fluid;

injecting means comprising nozzle means approximately coextensive with the passage width on opposite sides of said matrix to inject inclined streams of fluid towards said matrix and second compartment and into the second compartment;

means to transmit a portion of said second fluid directly from said second fluid circulating means to said injecting means;

means in said second fluid circulating means adapted to create a pressure in the injecting means sufficiently in excess of the pressure in the second compartment so that said inclined streams of fluid present a fluid barrier to leakage of the second fluid through the passage.

7. A rotary regenerative heater of claim 6 wherein said last mentioned means comprises an orifice means between the second fluid circulating means and the second compartment, and means to restrict the size opening of said orifice means.

References Cited by the Examiner

UNITED STATES PATENTS

| | | | |
|---|---|---|---|
| 232,429 | 9/80 | Adams | 165—103 |
| 2,929,127 | 3/60 | Johnson | 34—242 X |

FOREIGN PATENTS

| | | |
|---|---|---|
| 765,384 | 1/57 | Great Britain. |
| 829,884 | 3/60 | Great Britain. |
| 448,381 | 5/49 | Italy. |

OTHER REFERENCES

German printed application No. 1,062,263, printed July 1959.

German printed application No. 1,124,528, printed Mar. 1, 1962.

ROBERT A. O'LEARY, *Primary Examiner.*

CHARLES SUKALO, *Examiner.*